Figure 1:
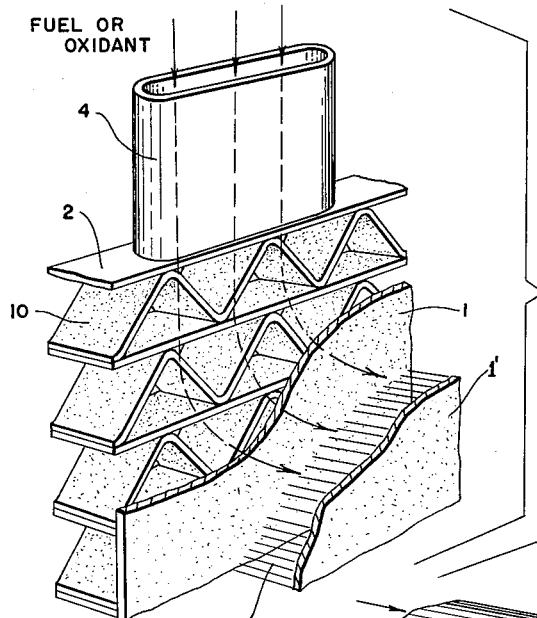

Sept. 14, 1965　　　　J. R. EHRENFELD　　　　3,206,334
CATALYTIC AND ELECTROCHEMICAL CELL STRUCTURES
Filed Feb. 15, 1965

INVENTOR
JOHN ROOS EHRENFELD
BY Rines and Rines
ATTORNEYS

United States Patent Office 3,206,334
Patented Sept. 14, 1965

3,206,334
CATALYTIC AND ELECTROCHEMICAL CELL
STRUCTURES
John Roos Ehrenfeld, South Acton, Mass., assignor to Prototech Incorporated, Cambridge, Mass., a corporation of Massachusetts
Filed Feb. 15, 1965, Ser. No. 432,723
7 Claims. (Cl. 136—86)

This application is a continuation-in-part of Serial No. 156,671, filed December 4, 1961, for Electrochemical Cell Structure.

The present invention relates to electrochemical cell structures and is particularly directed to novel electrode structures suitable for use in electrochemical processes of many types.

In co-pending application, Serial No. 154,724, filed November 24, 1961, by Walter Juda for Electrolytic Cell Structure, there is described a novel electrode-supporting structure that enables the practical fabrication and utilization of thin electronically-conductive layers that otherwise may not be self-supporting, and, in some cases, are difficult to manufacture with pores therein, as is required for certain electrode applications, including those required in fuel cells and the like. In accordance with the invention therein disclosed, such electronically-conductive layers are adhered, as by sintering, to electronic-insulator materials, preferably porous, and assuming the form of an array or plurality of continuous juxtaposed substantially parallel cells. Sinter techniques for forming and adhering porous conductive layers to a support are described, for example, in Treatise on Powder Metallurgy, C. Goetzel, Interscience Publishers, 1949, vol. 1, chapters 14, 15. The term "electronic insulator" moreover, as herein employed, connotes materials that do not support electronic conduction, such as usual insulators of glass, ceramics, and the like, as well as ionic-conducting solid materials, such as ion-exchange materials, discussed, for example, in Ion Exchange Resins, Robert Kunin, 2nd ed., 1959, John Wiley and Sons, Inc., New York, chapters 5 and 11.

As explained in the Juda application, it has been discovered that sintering thin metal or other similar electronically-conductive layers to such electronic-insulator materials has been found to result in a sturdy electrode configuration that is eminently suitable for supporting otherwise unsupportable thin electronically-conductive layers and that, in particular, is suitable for fabricating with pores therein, as a result of the sintering process, over both small and large-size areas.

Preferred materials of the character above-described include pyroceramic or high-temperature ceramic materials such as those manufactured under the trademark "Cercor" by the Corning Glass Works, having at least 50% and preferably much greater open-face area, with honeycomb-like cells of preferably porous-wall construction, having a wall thickness of the order of a few mils, a wall porosity of the order of 40%, more or less, and a cell cross-dimension of the order of 50 mils, more or less.

An object of the present invention is to provide a new and improved electrochemical cell structure that makes use of the principles of construction above-discussed, but with further advantageous results, including the utilization of the supporting structure itself as an inlet for fuel or oxidant in, for example, a fuel cell or similar apparatus.

A further object is to provide a novel electrode structure that enables the utilization of multiple catalytic action within the electrode structure or its environs.

Another object is to provide a new and improved structure through which fluid is to be passed substantially uniformly in straight-through paths for catalytic reaction.

An additional object is to provide a novel electrode structure that is particularly suited for operation at high temperatures.

Figure 2:
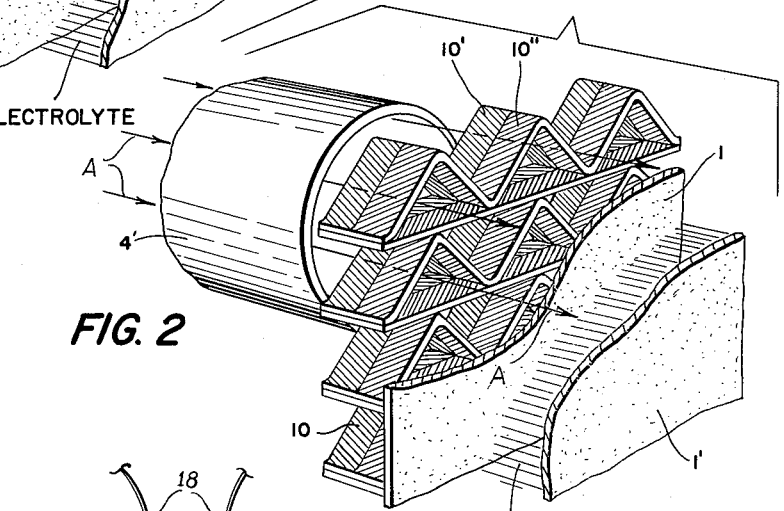
Figure 3:
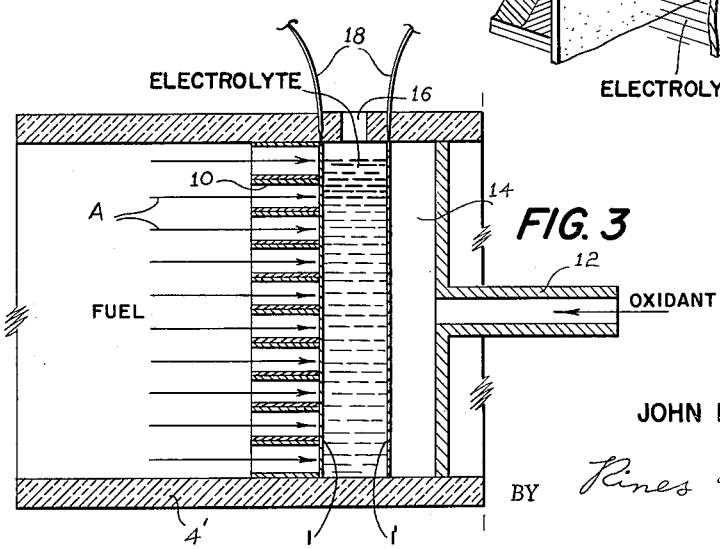

The invention will now be described in connection with the accompanying drawing, FIGURE 1 of which is a fragmentary perspective illustrating the introduction of a fuel or oxidant into a fuel cell in accordance with a feature of the invention;

FIGURE 2 is a similar view of a modification adapted for multiple catalytic operation; and FIGURE 3 is a longitudinal sectional view illustrating, representatively, the manner in which the embodiment of FIGURE 2 may incorporate the usual oxidant inlet, electrode leads, and vent.

Referring to FIGURE 1, a thin electronically-conductive porous layer or surface 1, such as a sintered platinized nickel, platinized silver, nickel, silver, or magnetic layer and the like, is shown adhered to, as by sintering, and supported by, the face of an array or plurality of continuous juxtaposed substantially parallel cells 10 of electronic insulator material, such as the porous pyroceramic material before-mentioned.

In accordance with the invention, use is made of the porosity of the cell walls 10, illustrated by the dots thereon, to introduce into the cell structure the fuel or oxidant for passage through the pores in the thin electrode surface 1 and into, for example, the electrolyte, so-labelled, of a fuel cell or similar chamber, shown bounded by a second similar porous electrode 1'. An inlet 4 is shown extending through a cell-sealing upper wall, closing off the side edges of the cell, to introduce the fuel or oxidant into the porous-walled cells 10, in the direction of the arrows. The supporting structure 10, in view of its properties above-mentioned, is thus employed as part of the inlet to introduce the fuel or oxidant substantially uniformly through the porous electrode surface 1, as well as serving as the electrode support.

Use may also be made of the properties of the support 10 to provide for multiple catalytic action. In FIGURE 2, for example, a coating 10' of a catalytic material, later discussed, is applied to the cell-wall structure 10, that carries or supports the porous electrode 1. For purposes of illustration, in order to show the wide versatility of the invention, the fuel or oxidant is shown, in FIGURE 2, introduced by an inlet 4' oriented along the axis of the cells. When a catalytic coating, or other provision of a catalyst 10' upon or within the cell structure 10, is employed, this mode of introduction of the fuel or oxidant subjects the same to catalytic action during passage through the cell structure.

As an example, the structure of FIGURE 2 is eminently suited to the reforming of fuels, such as methane, methanol and the like. If a hydrocarbon or other suitable fuel is introduced at 4', and a coating 10' of nickel is applied to, say, a first portion of the walls of the cells 10, and a second coating 10'' of, for example, iron oxide, is applied to a second portion of the cell walls, the following multiple catalytic action will take place within the electrode-supporting structure: first, at a temperature of the order of 500° C. or greater, the nickel catalytic layer 10' will act upon the methane or similar fuel passing thereby to effect reforming into carbon monoxide and hydrogen; and, secondly, the further catalytic action of the iron oxide layer 10'' will effect a conversion or "shift" to carbon dioxide and hydrogen, with hydrogen ions resulting after passage through the porous electrode 1. In this manner, the unitary structure 10–10'–10''–1 has been employed for multiple catalytic functions as well as electrode support. The heat of the electrochemical reaction in the fuel cell may also usefully be radiated uniformly by the electrode 1 into the cells 10 to aid in supplying the temperature for reformation.

As set forth in the aforesaid co-pending application of

Juda, and as shown in FIGURE 3 of the present application, a fuel cell of the type indicated fragmentarily in FIGURE 2 is commonly provided with an oxidant inlet 12 leading to a chamber 14 adjacent to gas-pervious electrode 1' (which may be mounted upon a multi-cellular electrode support); the enclosed space between electrodes 1 and 1' has a vent 16 at the top for escape of reaction products; and the electrodes are connected to an external circuit by lead conductors 18. In the illustrative construction of FIGURE 3 the usual housing for the fuel cell is constituted by extension of the fuel inlet pipe 4', which bounds the catalyst support 10, the electrolyte, and the chamber 14, and which may be round or rectangular, for example. The alignment of the flow axis of the fuel inlet with the axes of the cells of support 10 provides flow through the cells along straight-through paths as indicated diagrammatically in FIGURES 2 and 3 by arrows A.

The electrode 1 itself, alternatively, could embody the iron oxide in order to serve a catalytic function in the above example, or each of the faces of the structure 10 could be provided with a porous electrode or catalytic layer. Clearly, moreover, the catalytic material 10' or 10" may be applied or disposed in predetermined regions only of the cell structure, if desired, for particular localized results or other reasons.

Further modifications will also suggest themselves to those skilled in this art, and such are considered to fall within the scope and spirit of the present invention as defined in the appended claims.

What is claimed is:

1. In a structure through which fluid is to be passed substantially uniformly in straight-through paths, the combination of a catalyst support having an input side and an output side and comprising a multiplicity of substantially straight, continuous, juxtaposed, substantially parallel, tubular, open-ended cells disposed over substantially the entire area of said input and output sides in a two-dimensional array, said cells having cell walls extending along the length of the cells between said input and output sides of said support and comprising strips of electronic insulator material, said walls being very thin compared with the cross-dimensions of said cells in order to provide, large straight-through, open passages for fluid and having a length substantially greater than the thickness of said walls, conductive catalytic material being supported by walls of said cells for catalytic reaction with fluid passed through said cells, electrode means mounted upon said support for providing heat to said catalytic material and for connection to an external current-carrying circuit, and a fluid inlet having a flow axis oriented parallel to the length of said cells for directing fluid simultaneously along substantially parallel straight-through paths extending from said input side to said output side.

2. The combination of claim 1, in which said electrode means comprises a thin, gas-pervious electrode layer supported upon the output side of said support.

3. The combination of claim 2, further comprising an additional electrode layer spaced from the first-mentioned layer at the side thereof remote from said support, and an electrolyte disposed between said layers in contact therewith to form an electrolytic cell, said fluid being a fuel for said electrolytic cell.

4. The combination of claim 3, said catalytic material being arranged to be heated by heat from the electrolytic reaction in said electrolytic cell.

5. The combination of claim 3, said electrolytic cell having a housing surrounding said electrolyte and provided with a vent for escape of reaction products, and a chamber adjacent to said additional electrode layer provided with an oxidant inlet.

6. In a structure through which fluid is to be passed substantially uniformly in straight-through paths, the combination of a catalyst support having an input side and an output side and comprising a multiplicity of substantially straight, continuous, juxtaposed, substantially parallel, tubular, open-ended cells disposed over substantially the entire area of said input and output sides in a two-dimensional array, said cells having cell walls extending along the length of the cells between the input and output sides of said support and comprising strips of electronic insulator material, said walls being very thin compared with the cross-dimensions of said cells in order to provide, large straight-through, open passages for fluid and having a length substantially greater than the thickness of said walls, conductive catalytic material being supported by walls of said cells for catalytic reaction with fluid passed through said cells, means connected with the support and comprising a heat-radiating sheet at one side thereof for transferring heat into one end of said cells simultaneously over substantially the entire area of said side of the support, along the length of said cells and upon the catalytic material supported therein, and in addition to the heat of the fluid passed into said cells, and a fluid inlet having a flow axis oriented parallel to the length of said cells for directing fluid simultaneously along substantially parallel straight-through paths extending from said input side to said output side.

7. The combination of claim 6, wherein said sheet is a metal surface.

References Cited by the Examiner

UNITED STATES PATENTS

| 1,059,584 | 4/13 | Winand | 136—86 |
| 1,124,347 | 1/15 | Snelling | 136—86 |
| 2,387,454 | 10/45 | Marisic | 252—477 |
| 2,887,456 | 5/59 | Halford et al. | 136—86 |
| 3,148,089 | 9/64 | Oswin | 136—86 |

FOREIGN PATENTS 1,481 3/83 Great Britain.

WINSTON A. DOUGLAS, *Primary Examiner.*